(12) United States Patent
Lee et al.

(10) Patent No.: US 7,292,266 B2
(45) Date of Patent: Nov. 6, 2007

(54) IMAGE EVALUATION CHART AND PERFORMANCE TEST METHOD USING THE SAME

(75) Inventors: Kyoung-Tai Lee, Kyunggi-Do (KR); Hyeong-Jin Yun, Kyunggi-Do (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 723 days.

(21) Appl. No.: 10/735,425

(22) Filed: Dec. 12, 2003

(65) Prior Publication Data

US 2005/0036032 A1  Feb. 17, 2005

(30) Foreign Application Priority Data

Aug. 14, 2003 (KR) .................. 10-2003-0056470

(51) Int. Cl.
*H04N 17/00* (2006.01)
(52) U.S. Cl. .................................... 348/188
(58) Field of Classification Search ............... 348/188, 348/187, 180, 181, 185, 189, 190, 191
See application file for complete search history.

(56) References Cited

U.S. PATENT DOCUMENTS 6,992,696 B1 * 1/2006 Albertelli .................. 348/188

2004/0212680 A1 * 10/2004 Schroeder et al. .......... 348/188

FOREIGN PATENT DOCUMENTS

JP    2000224615 A  *  8/2000

* cited by examiner

*Primary Examiner*—Michael H. Lee
(74) *Attorney, Agent, or Firm*—Christensen O'Connor Johnson Kindness PLLC

(57) ABSTRACT

An image evaluation chart and a method for testing performances of the video equipment using the same. The image evaluation chart includes a resolution inspection area. The resolution inspection area includes a center point located at a center part of the chart, a regular-squared outer line located at outside of the center point, and a plurality of resolution measurement lines symmetrically arranged at right and left sections and upper and lower sections on the basis of the center point. Therefore, the image evaluation chart accurately and efficiently tests all performances, for example, resolution, balance, view angle, distortion, and focus, etc., of video equipment such as a camera by means of one-shot image capture, and provides users with reliable test data.

21 Claims, 6 Drawing Sheets

IMAGE EVALUATION CHART AND PERFORMANCE TEST METHOD USING THE SAME

BACKGROUND OF THE INVENTION

1. Field of the Invention

The present invention relates to an image evaluation chart, and more particularly to an image evaluation chart for efficiently testing all performances, for example, resolution, balance, view angle, distortion, and focus, etc., of video equipment such as a camera by means of one-shot image capture, and a method for testing performances of the video equipment using the same.

2. Description of the Related Art

Presently, an inspector visually tests performances of video equipment such as a camera. In more detail, the inspector separately tests individual electronic components such as a lens and a sensor, and checks operations of a complete product with his or her naked eye.

For the convenience of description and better understanding, an example of a conventional image evaluation chart is shown in FIG. 1, and a method for testing performance of video equipment using the conventional image evaluation chart is shown in FIG. 2.

The conventional method for testing performance of video equipment such as a camera will hereinafter be described with reference to FIGS. 1~2. A chart 5 is inserted between a projector 1 and a lens 3, and light from the projector 1 is projected on a wall 2 spaced apart from the lens 3 by a predetermined distance.

The light projected by the projector 1 is focused on a wall via the chart 5 and lens 3, such that a prescribed shape of the chart 5 is shown on the wall 2.

The prescribed shape of the conventional chart 5 is classified into a center display area A, eight first display areas B circularly surrounding the center display area A while being spaced apart from the center display area A by a predetermined distance, eight second display areas C circularly surrounding the first display areas B while being spaced apart from the first display areas B by a predetermined distance, and four third display areas D circularly surrounding the second display areas C while being spaced apart from the second display areas C by a predetermined distance.

Each display area includes eight inspection areas P denoted by "a", "b", "c", "d", "e", "f", "g", and "h" in FIG. 1 showing a partially enlarged view of one display area. The inspection area "a" is the largest one of the eight inspection areas P, and the inspection area "h" is the smallest one of the eight inspection areas P. That is, the inspection area is gradually reduced in alphabetical order from a to h. An image resolution can be tested using the eight inspection areas.

If the above-identified shape of the chart 5 is focused on the wall 2 after passing through the lens 3 by means of the projector 1, the inspector recognizes a resolution of the lens 3 by visually checking the an image displayed on the wall 2. Provided that all the inspection areas "a" to "h" are visually recognized by the inspector's naked eye, it is determined that the image focused on the wall has a high resolution. Provided that a plurality of inspection areas from "a" to either "d" or "e" are visually recognized by the inspector's naked eye, it is determined that the image focused on the wall has a medium resolution. Provided that any one of either the inspection area "g" or the inspection area "h" cannot be visually recognized by the inspector's naked eye, it is determined that the image focused on the wall has a low resolution.

As stated above, the inspector has visually recognized the resolution of the lens while viewing the image focused on the wall with his or her naked eye.

However, the aforementioned performance test method has a disadvantage in that the inspector cannot acquire a correct performance value when visually checking the resolution of video equipment. In more detail, because individual inspectors take a subjective view of accuracy of a focus, it is impossible for each inspector to acquire a correct performance value such that resultant data is unreliable.

Further, the aforementioned performance test method allows individual electronic components, for example, a lens and a sensor, etc., to be tested separately from each other, resulting in a delayed test speed and deteriorated working efficiency.

SUMMARY OF THE INVENTION

Therefore, the present invention has been made in view of the above problems, and it is an object of the present invention to provide an image evaluation chart for accurately and efficiently testing all performances, for example, resolution, balance, view angle, distortion, and focus, etc., of video equipment such as a camera by means of one-shot image capture, and providing users with reliable test data.

It is another object of the present invention to provide a method for testing a variety of performances of video equipment, for example, resolution, balance, view angle, distortion, and focus, etc., using the image evaluation chart.

In accordance with one aspect of the present invention, the above and other objects can be accomplished by the provision of an image evaluation chart, comprising: a resolution inspection area including: a center point located at a center part of the chart; a regular-squared outer line located at outside of the center point; and a plurality of resolution measurement lines symmetrically arranged at right and left sections and upper and lower sections on the basis of the center point, wherein each of the plurality of resolution measurement lines is classified into a plurality of black-colored lines and a plurality of white-colored lines, the black-colored lines and the white-colored lines are alternately arranged while being spaced apart from each other at regular intervals, and the longer a distance from the center point to the regular-squared outer line, the larger a width of the resolution measurement line.

Preferably, although the resolution measurement line is vertically or horizontally cut on the basis of any one of its own points, a width ratio of the black-colored line is the same as that of the white-colored line.

Preferably, the chart is manufactured on the basis of an LPM (Line Per Millimeter) unit serving as a DPI (Dot Per Inch) standard of a lens.

Preferably, one end of the resolution measurement line is close to the center point, the other end reaches the outer line to create the largest line width, and the largest line width is more than two times larger than the nearest line width close to the center point.

Preferably, five black-colored lines are contained in the right and left sections and the upper and lower sections such that 20 black-colored lines are contained in the resolution inspection area, and four white-colored lines are contained in the right and left sections and the upper and lower sections such that 16 white-colored lines are contained in the resolution inspection area.

Preferably, one resolution inspection area is positioned at the center of the chart, and more than one resolution inspection area is positioned in the vicinity of the resolution inspection area positioned at the center of the chart.

Preferably, the image evaluation chart has the same horizontal and vertical ratios as those of a pixel of an image sensor of video equipment.

Preferably, a plurality of balance measurement lines are symmetrically displayed at individual positions corresponding to individual resolution measurement lines at the outside of the resolution inspection area, while being spaced apart from the outer line by a predetermined distance, wherein each of the balance measurement lines is classified into a plurality of black-colored lines and a plurality of white-colored lines, and the black-colored lines and the white-colored lines indicated by straight lines each having a predetermined length are alternately arranged while being spaced apart from each other at regular intervals.

Preferably, the balance measurement lines each have the same width as the largest line width of the resolution measurement line.

Preferably, a plurality of position check points are symmetrically arranged among the balance measurement lines in a diagonal-direction to the center point.

In accordance with another aspect of the present invention, there is provided a method for testing performance of video equipment, comprising the steps of: a) preparing a chart including a plurality of balance measurement lines and a resolution inspection area which is composed of a center point located at a center part of the chart, a regular-squared outer line located at outside of the center point, and a plurality of resolution measurement lines symmetrically arranged at right and left sections and upper and lower sections on the basis of the center point, wherein each of the resolution measurement lines is classified into a plurality of black-colored lines and a plurality of white-colored lines, the black-colored lines and the white-colored lines are alternately arranged while being spaced apart from each other at regular intervals, the longer a distance from the center point to the regular-squared outer line, the larger a width of the resolution measurement line, a first resolution inspection area is positioned at the center of the chart and more than one resolution inspection area is located in the vicinity of the first resolution inspection area, wherein the balance measurement lines are displayed at individual positions corresponding to individual resolution measurement lines at the outside of the resolution inspection area located at the center of the chart, and are classified into a plurality of black-colored lines and a plurality of white-colored lines that are alternately arranged while being spaced apart from each other by a predetermined distance; b) properly installing a lighting device to provide the chart with uniform illuminance; c) properly installing video equipment to allow the center of the chart to be aligned with the center of an image sensor of the video equipment; d) capturing an image of the chart; and e) comparing a reference value for the chart with a real value created by capturing the chart image, and testing a variety of performances such as resolution, balance, view angle, distortion, and focus.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
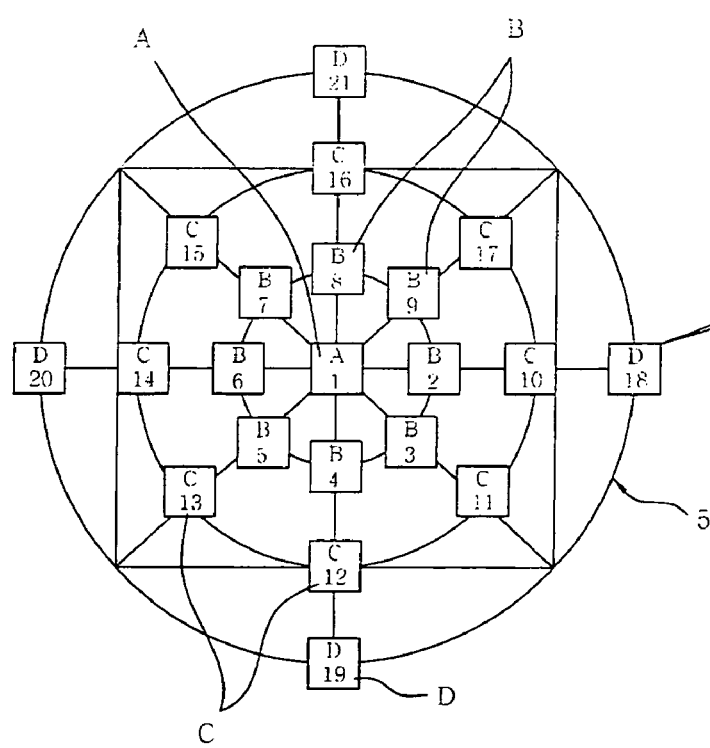
FIG. 1 is an exemplary view illustrating a conventional image evaluation chart.
Figure 1:
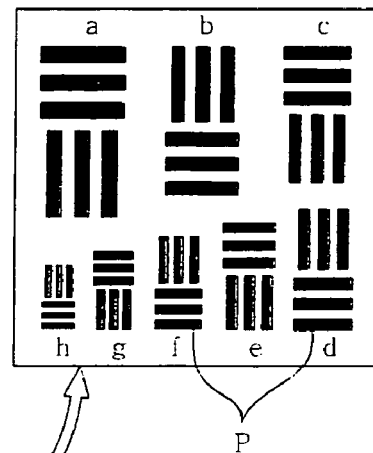
Figure 2:
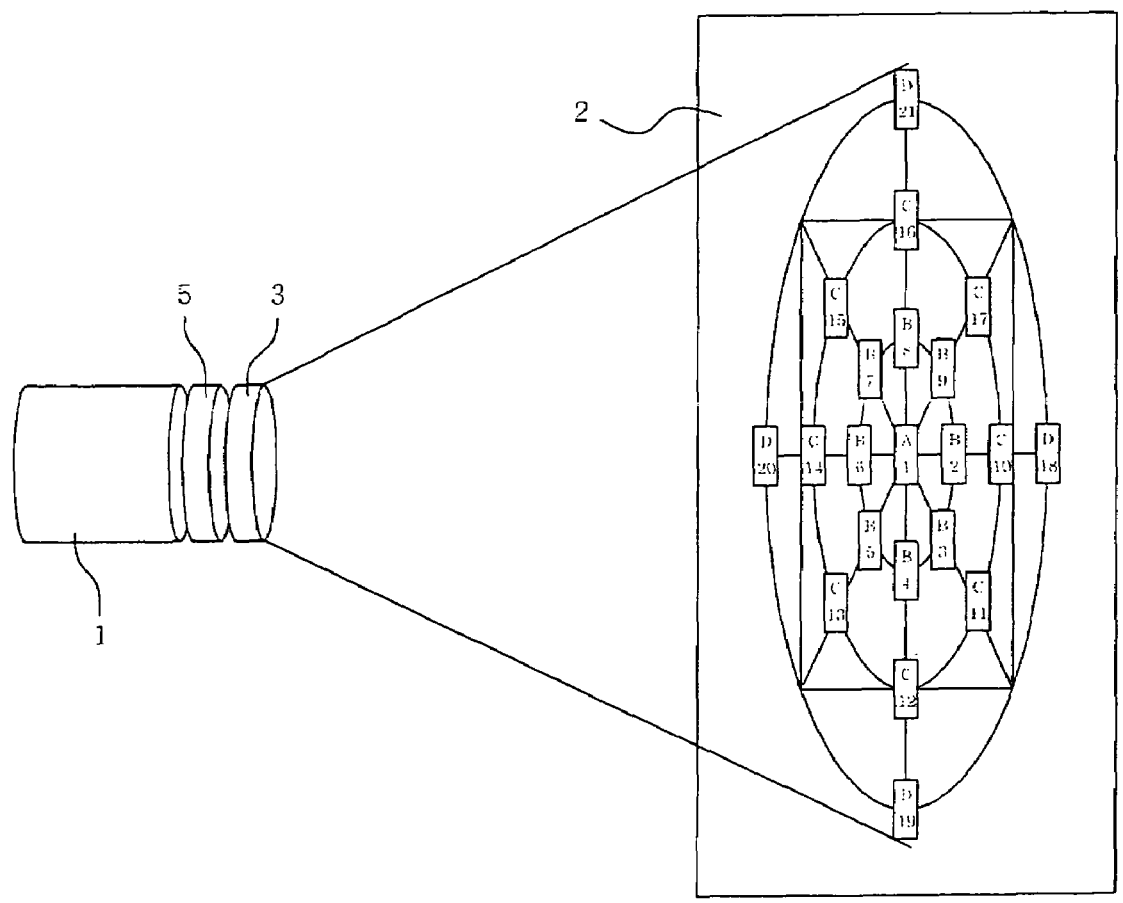
FIG. 2 is a lateral view illustrating a conventional apparatus for use with a method for testing performances of video equipment.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 3:
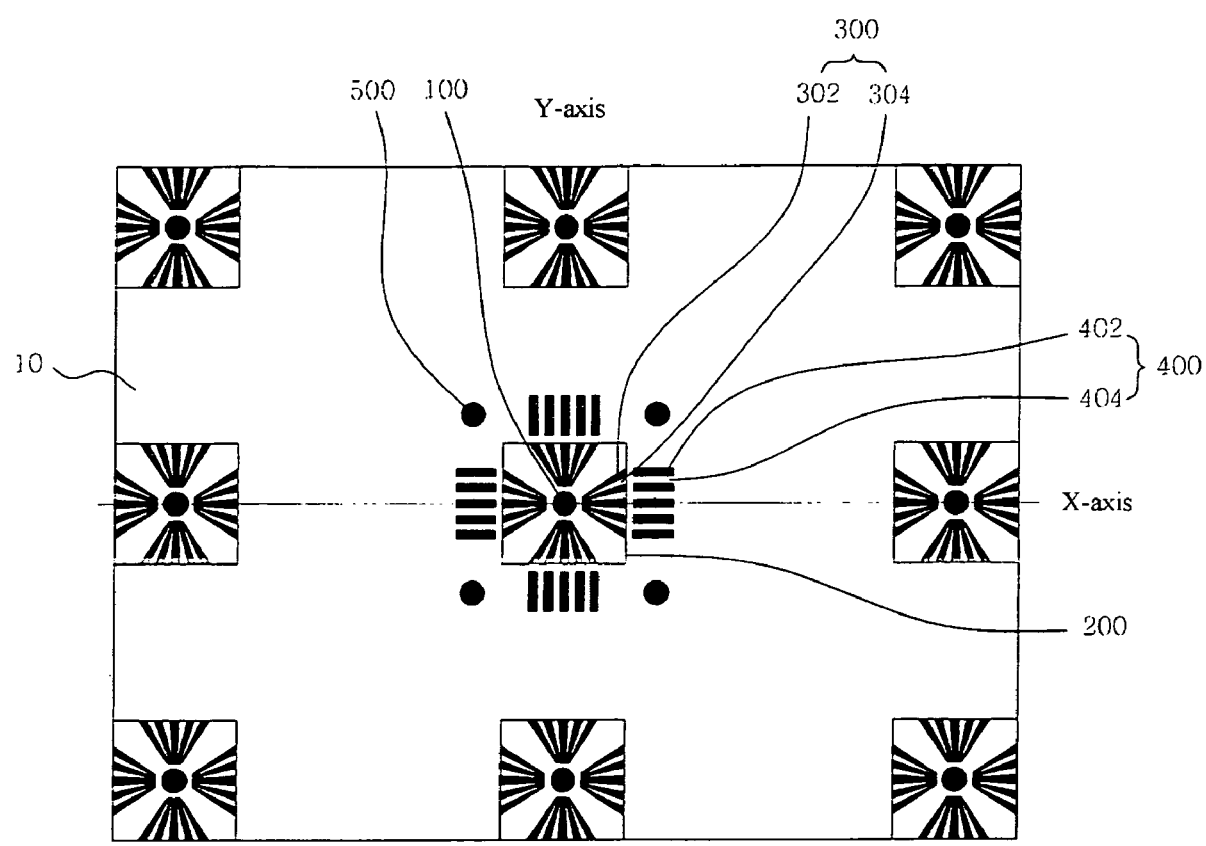
FIG. 3 is an exemplary view illustrating configuration of an image evaluation chart in accordance with a preferred embodiment of the present invention.
Figure 4:
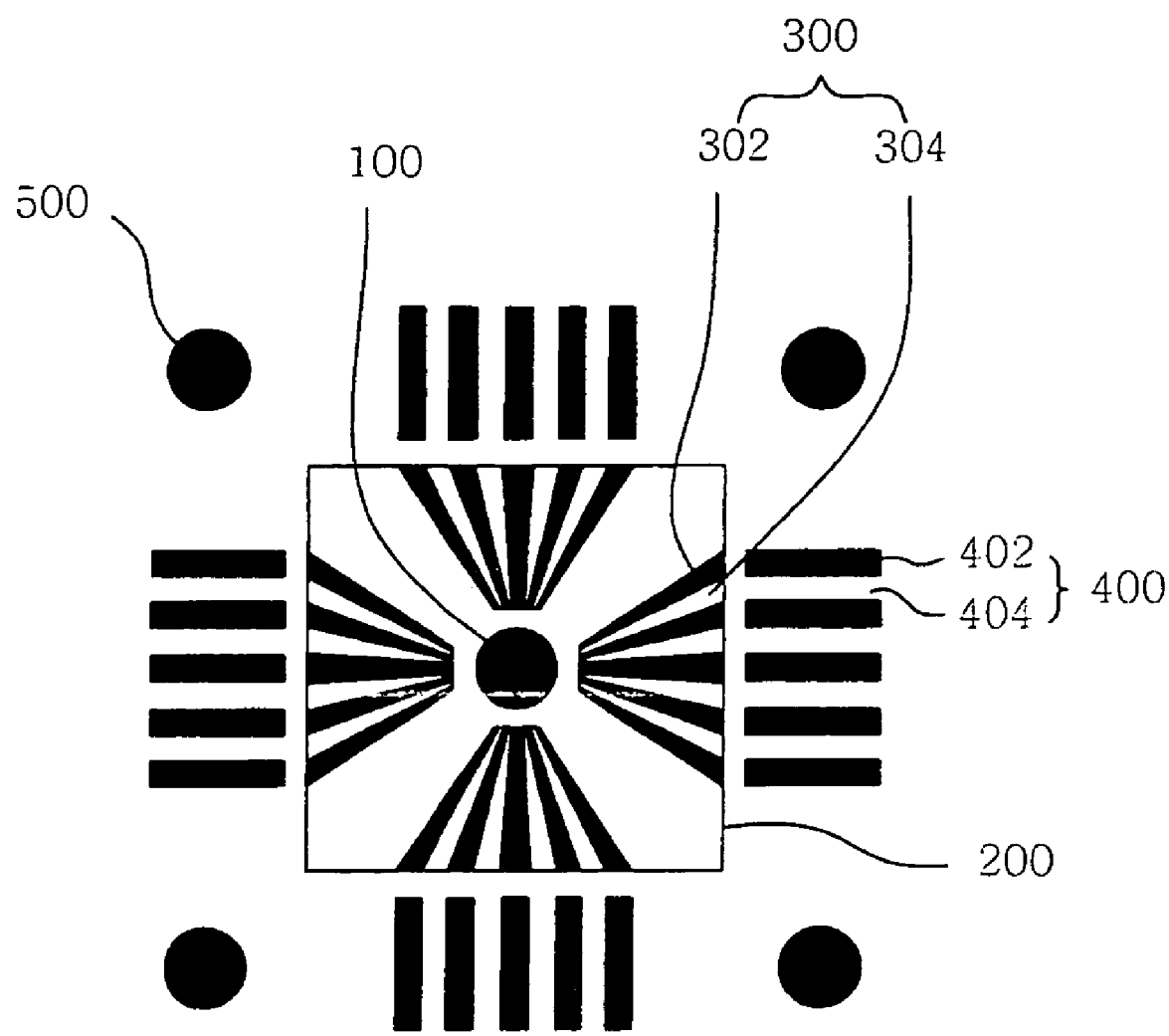
FIG. 4 is an enlarged view illustrating a center portion of the image evaluation chart shown in FIG. 3 in accordance with a preferred embodiment of the present invention.

FIG. 3 is an exemplary view illustrating configuration of an image evaluation chart in accordance with a preferred embodiment of the present invention. FIG. 4 is an enlarged view illustrating a center portion of the image evaluation chart shown in FIG. 3.

Referring to FIGS. 3~4, the image evaluation chart is manufactured on the basis of an LPM (Line Per Millimeter) unit serving as a DPI (Dot Per Inch) standard of a lens. In case of manufacturing the image evaluation chart, it is preferable for the image evaluation chart to have the same horizontal and vertical ratios as those of a pixel of an image sensor of video equipment.

According to the present invention, the chart 10 includes a resolution inspection area having a resolution measurement line 300, a balance measurement line 400, and a position check point 500.

The resolution inspection area includes a center point 100 located at its own center part, a regular-squared outer line 200 located at the outside of the center point 100, and a plurality of resolution measurement lines 300 symmetrically arranged on the basis of the center point 100. Two resolution measurement lines 300 are symmetrically located at the right and left of the center point 100, and the remaining resolution measurement lines 300 are symmetrically located at the upper and lower portions of the center point 100.

The resolution measurement line 300 is classified into a plurality of black-colored lines 302 and a plurality of white-colored lines 304. Black-colored lines and white-colored lines are alternately arranged while being spaced apart from each other by a predetermined distance such that the black-colored lines 302 and the white-colored lines 304 are alternately arranged while being spaced apart from each other at regular intervals. One ends of individual lines 302 and 304 are close to the center point 100 while being spaced apart from the center point 100 by a predetermined distance, and the other ends are overlapped with the regular-squared outer line 200. The longer the distance from the center point 100 to the outer line 200, the larger the width of the resolution measurement line 300. That is, the nearest one to the center point 100 has the narrowest line width, and the nearest one to the outer line 200 has the largest line width.

In this case, it is preferable for the largest line width of the resolution measurement line 300 to be more than two times larger than the nearest line width of the resolution measurement line 300.

Preferably, although the resolution measurement line 300 is vertically or horizontally cut on the basis of any one of its own points, a width ratio of the black-colored line 302 is the same as that of the white-colored line 304.

Preferably, the number of all the black-colored lines 302 contained in the resolution measurement line 300 is 20. In more detail, five black-colored lines 302 are contained in four sections (i.e., right and left sections, and upper and lower sections on the basis of the center point 100), such that the total 20 black-colored lines are contained in the outer line 200. Preferably, four white-colored lines 304 are contained in the above four sections, such that the total number of all the white-colored lines 304 contained in the resolution measurement line 300 is 16.

One resolution inspection area is positioned at the center of the chart 10, and more than one resolution inspection area is positioned in the vicinity of the above resolution inspection area. Preferably, in order to measure all performances using only one-shot image capture operation, one resolution inspection area is positioned at the center of the chart 10, right and left sections each contain one resolution inspection area, upper and lower sections each contain one resolution inspection area, and four diagonal sections each contain one resolution inspection area, such that the total 9 resolution inspection areas are contained in the chart 10, as shown in FIG. 3.

It should be noted that a resolution is measured using only one resolution inspection area positioned at the center of the chart 10, as will be described later. Therefore, provided that a user wishes to measure only resolution data of the video equipment, a chart having only one resolution inspection area is made available.

In the meantime, the balance measurement line 400 is displayed at individual positions corresponding to the resolution measurement line 300 at the outside of the aforementioned resolution inspection area positioned at the center of the chart 10, such that it can measure a variety of balance data of an image, i.e., quality and uniformity of the whole image, and color characteristics, etc.

The balance measurement line 400 is classified into a plurality of straight black-colored lines 402 and a plurality of straight white-colored lines 404. Black-colored lines 402 and white-colored lines 404 are alternately arranged while being spaced apart from each other by a predetermined distance such that the black-colored lines 402 and the white-colored lines 404 are alternately arranged while being spaced apart from each other at regular intervals.

In this case, each width and overall arrangement of the black-colored lines 402 and the white-colored lines 404 contained in the balance measurement line 400 are the same as the largest width and overall arrangement of the resolution measurement line 300.

The number of all the black-colored lines 402 contained in the balance measurement line 400 is 20. In more detail, five black-colored lines 402 are contained in four sections (i.e., right and left sections, and upper and lower sections shown in FIG. 4), such that the balance measurement line 400 contains the total 20 black-colored lines 402. Preferably, four white-colored lines 404 are contained in the above four sections, such that the total number of all the white-colored lines 404 contained in the balance measurement line 400 is 16.

Four position check points 500 exist at the outside of the center resolution inspection area, one position check point 500 is located between two balance measurement lines 400 such that the four position check points 500 are symmetrically arranged among the balance measurement lines 400 in a diagonal direction to the center point 100.

In this case, the position check points 500 are adapted to adjust a position of the chart 10. Particularly, it would be more efficient for the position check points 500 to be applied to a specific chart having only one resolution inspection area.

A method for testing a variety of performances of video equipment using the aforementioned image evaluation chart and its effects will hereinafter be described.

Firstly, the image evaluation chart 10 is provided and a predetermined lighting device is properly installed to provide the chart 10 with uniform illuminance.

Thereafter, the video equipment is properly installed to allow the center of the chart 10 to be aligned with the center of an image sensor of the video equipment, and then an image created by the chart 10 is captured.

A reference value for the chart 10 is compared with a real value created by the above chart image capture such that a variety of performances such as resolution, balance, view angle, distortion, and focus can be tested.

Figure 5:
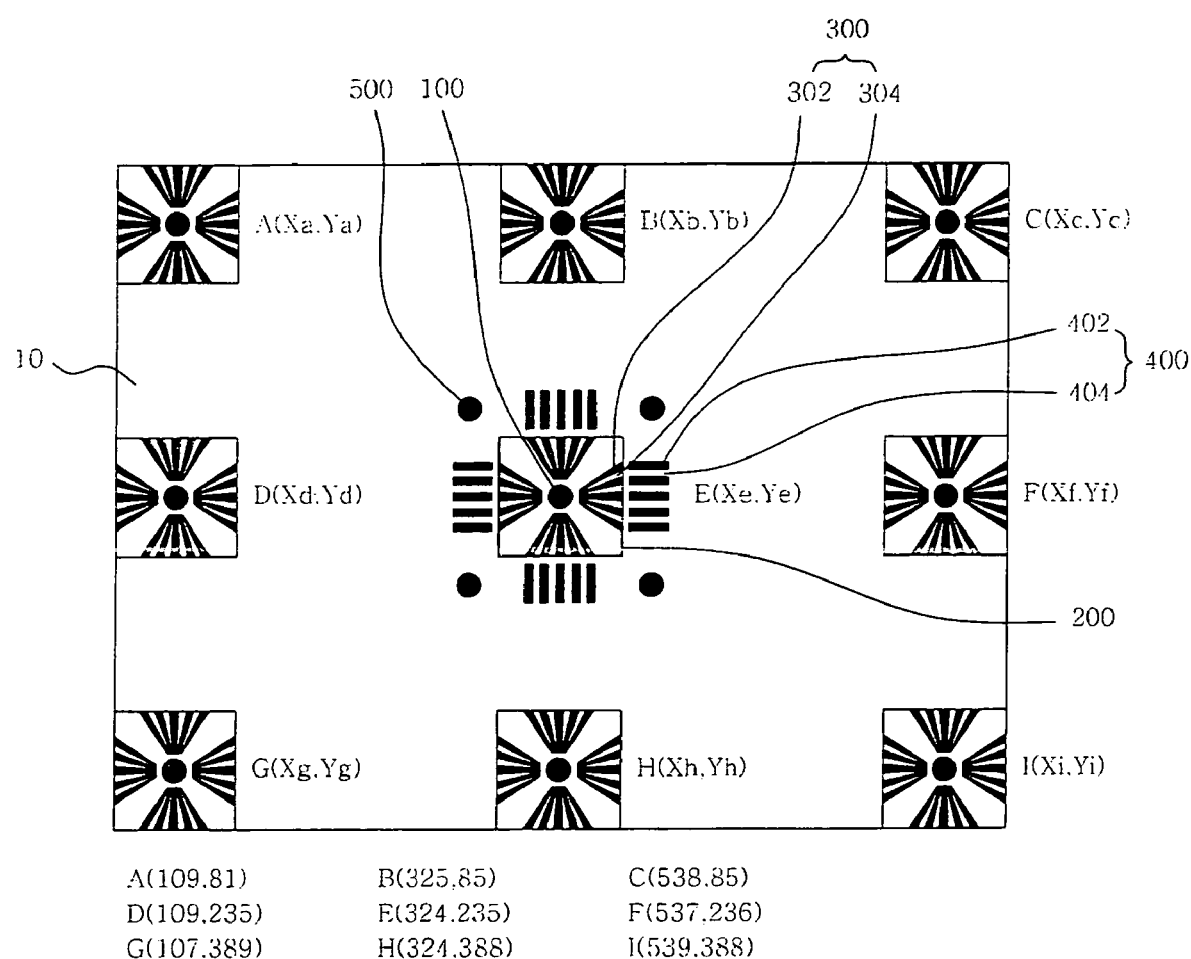
FIG. 5 is an exemplary view illustrating an image evaluation chart wherein coordinates of individual center points are indicated.

For the convenience of description and better understanding of the present invention, a method for acquiring a variety of performances of the video equipment, for example, resolution, balance, view angle, distortion, and focus, will hereinafter be described with reference to FIG. 5. FIG. 5 is an exemplary view illustrating an image evaluation chart wherein coordinates of individual center points are indicated.

Firstly, a method for evaluating an image resolution will hereinafter be described. In order to evaluate the image resolution, an inspector visually checks the resolution measurement line 300 of the captured chart 10, finds a clearly-shown area from among the resolution measurement line 300, and finally calculates a resolving power (i.e., a resolution) of the found clearly-shown area.

In more detail, the longer the distance from the center point 100 to the outer line 200, the larger the width of the resolution measurement line 300, such that a part overlapped with the outer line 200 corresponds to an image area having a minimal resolution. Therefore, provided that not only the overlapped part but also nearby areas close to the center point 100 are clearly shown, the inspector determines that a target image has a high resolution.

It is preferable for a lens evaluation method serving as one of a variety of resolution evaluation methods to determine a reference value on the basis of a predetermined value of 100 LPM. In more detail, it is preferable for the resolution measurement line 300 to be overlapped with the outer line 200 by a predetermined length of 100 LPM, such that the length of 100 LPM is minimally guaranteed.

Provided that an image sensor of the video equipment has a predetermined resolving power of 1001 lines per 1 mm, the chart captured at a predetermined position spaced apart from the chart by a predetermined distance of 1m has a predetermined resolving power of 1001 lines per 6.4 mm. A relationship between the LPM width of the chart and the real width of the chart is shown in the following Table 1.

TABLE 1

| LPM width (line) | Real width (mm) |
|---|---|
| 100 | 6.4 |
| 200 | 3.2 |
| 300 | 2.13 |
| 400 | 1.6 |
| 500 | 1.28 |

In the meantime, a prescribed equation for calculating a resolving power is shown in the following Equation 1:

$$Ref = Wa - Ba \qquad \text{[Equation 1]}$$
$$Wa = \sum_{i=1}^{16} Wi/16, \; Ba = \sum_{i=1}^{20} Bi/20$$

where "Ref" is a resolving power, "Wa" is an overall mean value of the white-colored lines contained in the resolution measurement line, and "Ba" is an overall mean value of the black-colored lines.

Therefore, the aforementioned resolution evaluation method vertically and horizontally analyzes a predetermined point contained in the resolution measurement line 300, calculates a resolving power of the predetermined point using Equation 1, and compares the calculated resolving power with a predetermined reference value with reference to data contained in Table 1 in such a way that a resolution can be measured.

An example of the resolution evaluation method will hereinafter be described.

In the case of capturing the chart, provided that either one of a plurality of lines contained in the resolution measurement line 300 overlaps with the outer line 200, a plurality of measurements W0~W15 and B0~B19 are created from the overlapped portion. Provided that measurements W0=143, W1=147, W2=143, W3=143, W4=141, W5=151, W6=144, W7=141, W8=143, W9=142, W10=144, W11=145, W12=149, W13=140, W14=143, and W15=142 are determined, and other measurements B0=29, B1=43, B2=30, B3=45, B4=49, B5=33, B6=30, B7=31, B8=32, B9=36, B10=38, B11=30, B12=32, B13=35, B14=44, B15=45, B16=43, B17=31, B18=45, and B19=33 are determined, a mean value of "Wa" is determined to be 144.5 according to the Equation 1, and a mean value of "Ba" is determined to be 36.7 according to the Equation 1, such that a resolving power of the portion overlapped with the outer line 200 is also determined to be 107.8 LPM.

Therefore, a reference resolving power of a portion overlapped with the outer line is determined to be 100 LPM as shown in the Table 1, and a calculated resolving power is determined to be 107.8 LPM, and a resolution is evaluated on the basis of a difference between 100 LPM and 107.8 LPM.

In the meantime, if there is a need for an inspector to acquire a resolution by capturing an image of a small-sized object, such a resolution is needed for a scanner or a printer. However, because a camera captures an image dependent on a view angle, resolving power of the camera becomes meaningless. Therefore, if the resolution is determined when manufacturing an initial chart, the initial chart is correctly resolved and its resolving result data is created, it is determined that the resolution given by a chart layout procedure is minimally guaranteed.

A method for evaluating balance will hereinafter be described.

Firstly, the balance measurement line 400 is analyzed to acquire individual values of the white-colored line 404 and the black-colored line 402, the acquired values are applied to Equation 1, and a reference resolving power is calculated using a difference between the black-colored line 402 and the white-colored line 404.

Then, individual resolving powers of nine resolution measurement lines 300 from A to I are calculated using the Equation 1. Particularly, individual resolving powers of some parts overlapped with the outer line 200 are each calculated, a reference resolving power is compared with the calculated resolving power, and thereby a balance is evaluated on the basis of a difference between the reference resolving power and the calculated resolving power.

In more detail, the reference resolving power is compared with nine calculated resolving powers of the nine resolution measurement lines 300, the ratio of the reference resolving power to each calculated resolving power is calculated and determined to be "1", it is determined that the lens and the image sensor each have a uniform balance performance.

The difference between the resolving power of the black-colored line and the other resolving power of the white-colored line is shown as a difference in color between images captured by video equipment, such that uniformity data of an inner sensor of the video equipment, for example, color characteristics and resolving power characteristic, etc., can be acquired.

Differently from such uniformity of the sensor, undesired difference may occur in white-colored lines for every area or black-colored lines for every area due to the lens characteristics, such that the lens characteristics can also be checked.

A method for calculating a view angle serving as a refraction angle of the light will hereinafter be described.

Firstly, position values of four center points located at individual corners of the chart are acquired, and a length of a real point recognizable when manufacturing the chart is compared with a pixel length of the captured image, such that a view angle can be determined using the following Equation 2:

$$\text{view angle} = \tan^{-1}\{(dis\_d/2)/D\} \times 2$$
$$dis\_d = \text{sqrt}(dis\_x^2 + dis\_y^2) \qquad \text{[Equation 2]}$$

where "dis_d" is a distance of a diagonal line actually captured, "D" is a distance between the chart and the video equipment, "dis_x" is a distance of a really-captured "X", "dis_y" is a distance of really-captured "Y", and "sqrt" means a square root.

One example for calculating a view angle using the Equation 2 will hereinafter be described with reference to FIG. 5.

Provided that the distance between the chart and the video equipment is a predetermined distance of 1 m, the chart has a horizontal width of 650 mm and a vertical width of 480 mm, and a real image cell of the sensor indicates VGA(640×480) information, a view angle is denoted by "$\tan^{-1}\{(dis\_d/2)/1000\} \times 2$".

The distance "dis_x" of the really-captured "X" is denoted by "640×640/(Xf−Xd)", and the distance "dis_y" of the really-captured "Y" is denoted by "480×480/(Yh−Yb)", such that the distance "dis_d" of the really-captured diagonal line is denoted by "$\text{sqrt}(dis\_x^2 + dis\_y^2)$".

For reference, "Xf", "Xd", "Yh", and "Yb" are adapted to indicate coordinates of four center points arranged at squared corners of the chart shown in FIG. 5.

Provided that prescribed conditions "Xf−Xd=428" and "Yh−Yb=760" are met, the distance of X is denoted by "dis_x=409600/428≈957", and the distance of Y is denoted by "dis_y=230400/303≈760, such that the distance of the diagonal line is denoted by "dis_d=sqrt($957^2+760^2$)≈1222".

Therefore, provided that the above-identified values are applied to the Equation 2, a view angle is denoted by "$\tan^{-1}${(1222/2)/1000}×2≈31.425×2=62.85°.

In this case, a predetermined image size of 640×640 is applied to a procedure for calculating the distance of the really-captured "X", because the number of horizontal image cells of the sensor is 640 and a center point of one end of the horizontal line of a manufactured chart is spaced apart from that of the other end of the horizontal line by a predetermined distance of 640 mm. Further, a predetermined image size of 480×480 is applied to a procedure for calculating the really-captured "Y", because the number of vertical image cells of the sensor is 480 and a center point of one end of the vertical line of a manufactured chart is spaced apart from that of the other end of the vertical line by a predetermined distance of 480 mm.

A method for calculating image distortion will hereinafter be described with reference to FIG. 5.

The image distortion is calculated by comparing symmetrical points of an X-axis with those of a Y-axis to recognize a difference between them, as denoted by the following Equation 3:

Total distortion={$X$-axis distortion+$Y$-axis distortion}/2

$X$-axis distortion={($Xc$−$Xa$)+($Xi$−$Xg$)}/{$Xf$−$Xd$}×2}

$Y$-axis distortion={($Yg$−$Ya$)+($Yi$−$Yc$)}/{$Yh$−$Yb$}×2}    [Equation 3]

where "Xc−Xa" indicates a difference between X coordinates of center points of both upper ends of the chart, "Xi−Xg" indicates a difference between X coordinates of center points of both lower ends of the chart, "Xf−Xd" indicates a difference between X coordinates of center points of both center ends of the chart, "Yg−Ya" indicates a difference between Y coordinates of center points of upper and lower left-sided ends of the chart, "Yi−Yc" indicates a difference between Y coordinates of center points of upper and lower right-sided ends of the chart, and "Yh−Yb" indicates a difference between Y coordinates of center points of upper and lower center ends of the chart.

Referring to Equation 3 and the above description, X-axis distortion and Y-axis distortion are calculated and added to each other, and the added result is divided by 2 in such a way that total distortion is calculated. Distortion information indicates a mean value of the acquired image distortions, such that the sum of the X-axis distortion and Y-axis distortion must be divided by 2, resulting in a mean distortion of the X-axis distortion and the Y-axis distortion.

For better understanding of the aforementioned description, a method for calculating a distortion value when a distortion area is formed at the corner of the chart will hereinafter be described with reference to FIG. 5.

If individual coordinates are applied to the Equation 3 to acquire a distortion value, total distortion is denoted by {(538−109)+(539−107)}/{(537−109)×2}+{(389−81)+(388−85)}/{(388−85)×2}/2≈{(1.00584)+(1.00825)}/2=1.007045.

Therefore, if the above result is expressed in terms of a percentage, total distortion is determined to be 0.7045%.

A method for controlling a focus will hereinafter be described.

A uniform focus between an overall area of the lens and the sensor, instead of a focus between a partial area of the lens and the sensor, must be calculated and acquired. Therefore, if a maximum value of average sharpness of individual areas is calculated using the inventive chart, and a focus is determined by the maximum value, a correct focus can be determined. In other words, if a focus is set to the maximum value of the average sharpness, the clearest image, i.e., an image having the best sharpness, is created.

In this case, the sharpness means a slope value of an edge between a white-colored area and a black-colored area displayed on the chart.

For reference, a focus may be determined by calculating variation in values acquired when capturing a black-colored chart having a white-colored background. Otherwise, a focus may be determined by calculating variation in values acquired when capturing a white-colored chart having a black-colored background.

For better understanding of the present invention, one example for setting a focus to a maximum value will hereinafter be described with reference to FIGS. 6 and 7.

Figure 6:
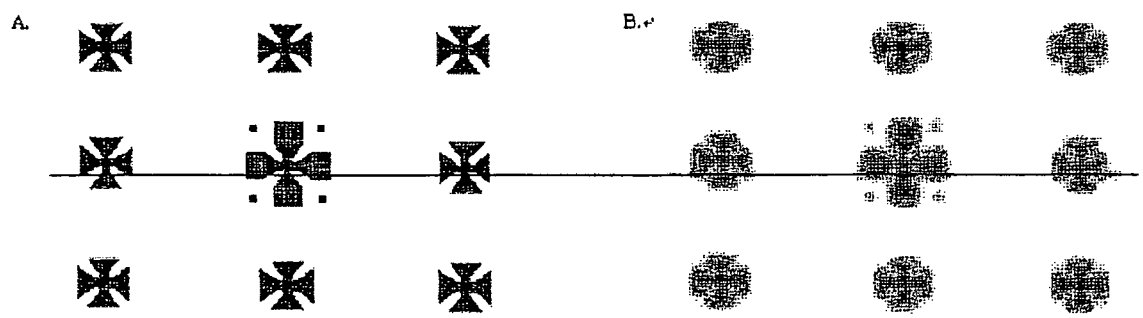
FIG. 6 shows an exemplary image created by a correct focus and an exemplary image created by an incorrect focus such that a focus is accurately acquired in accordance with a preferred embodiment of the present invention.

Referring to FIG. 6, the picture denoted by "A" is an image created by a correct focus reaching the lens and the sensor, and the other picture denoted by "B" is an image created by an incorrect focus reaching the lens and the sensor. FIG. 7 is a graph illustrating exemplary values acquired from an image located on a red-colored horizontal line shown in FIG. 6. As shown in FIG. 7, it can be easily recognized that an image value is greatly affected by the accuracy of the focus.

Figure 7:
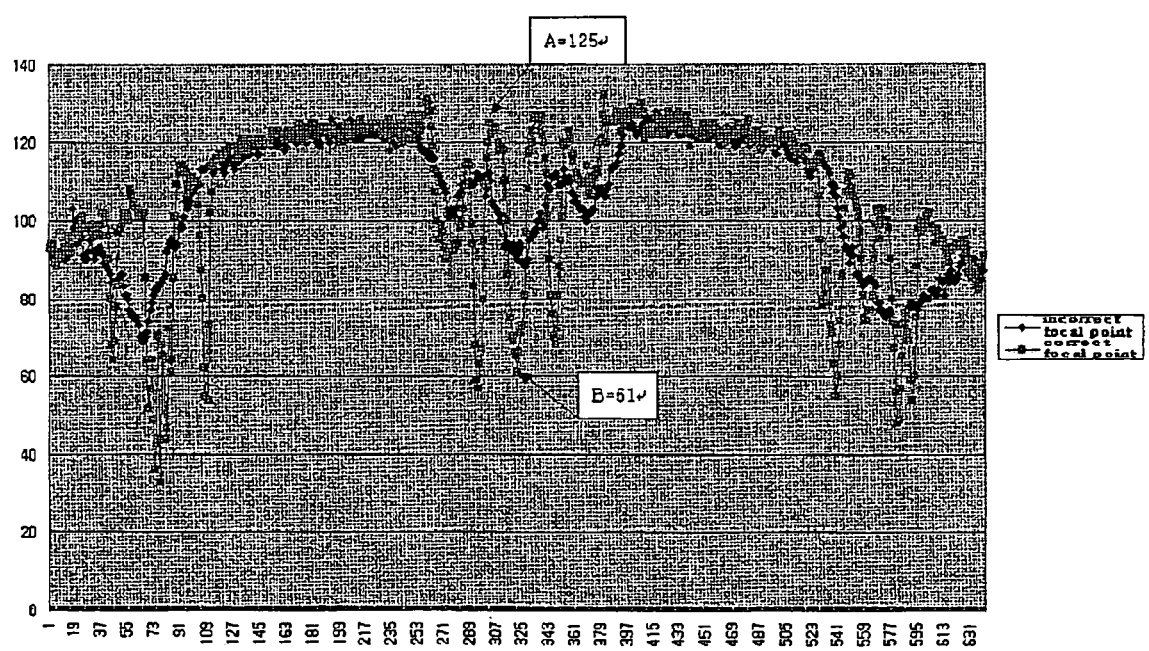
FIG. 7 is a graph illustrating exemplary values acquired from an image located on a horizontal line shown in FIG. 6 in accordance with a preferred embodiment of the present invention.

The maximum value of average sharpness created by a correct focus must be firstly calculated with reference to the graph shown in FIG. 7.

A method for acquiring sharpness of only one line ranging from a point "A" to a point "B" located at-the center of the graph will hereinafter be described with reference to FIG. 7. It should be noted that 11 points exist between the points A and B, a difference between the values of the points A and B is denoted by "125−61=64".

Therefore, the sharpness of the above line is determined to be about 5.82, i.e., 64/11≈5.82.

In this way, overall sharpness of a graphically-shown image is acquired, and a mean value of the acquired sharpness is also acquired. In this case, although an appropriate focus can be created using sharpness of only some areas contained in the image, the inspector can acquire a more accurate focus when total sharpness of an overall image is applied to the above sharpness calculation procedure, due to characteristics of the lens.

In this way, if an overall average sharpness is acquired, and a focus is set to the maximum value of the acquired sharpness, the clearest image having the best sharpness can be acquired.

As apparent from the above description, the present invention provides an image evaluation chart for accurately and efficiently testing all performances, for example, resolution, balance, view angle, distortion, and focus, etc., of video equipment such as a camera by means of one-shot image capture, and providing users with reliable test data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image evaluation chart, comprising:
   a resolution inspection area including:
   a center point located at a center part of the chart;
   a regular-squared outer line located at outside of the center point;
   a plurality of position check points being symmetrically arranged in a diagonal direction to the center point; and
   a plurality of resolution measurement lines symmetrically arranged at right and left sections and upper and lower sections on the basis of the center point,
   wherein each of the plurality of resolution measurement lines is classified into a plurality of black-colored lines and a plurality of white-colored lines, the black-colored lines and the white-colored lines are alternately arranged while being spaced apart from each other at regular intervals, and the longer a distance from the center point to the regular-squared outer line, the larger a width of the resolution measurement line.

2. The image evaluation chart as set forth in claim 1, wherein:
   although the resolution measurement line is vertically or horizontally cut on the basis of any one of its own points, a width ratio of the black-colored line is the same as that of the white-colored line.

3. The image evaluation chart as set forth in claim 1, wherein the chart is manufactured on the basis of an LPM (Line Per Millimeter) unit serving as a DPI (Dot Per Inch) standard of a lens.

4. The image evaluation chart as set forth in claim 1, wherein:
   one end of the resolution measurement line is close to the center point, the other end reaches the outer line to create the largest line width, and the largest line width is more than two times larger than the nearest line width close to the center point.

5. The image evaluation chart as set forth in claim 1, wherein:
   five black-colored lines are contained in the right and left sections and the upper and lower sections such that 20 black-colored lines are contained in the resolution inspection area, and four white-colored lines are contained in the right and left sections and the upper and lower sections such that 16 white-colored lines are contained in the resolution inspection area.

6. The image evaluation chart as set forth in claim 1, wherein:
   one resolution inspection area is positioned at the center of the chart, and more than one resolution inspection area is positioned in the vicinity of the resolution inspection area positioned at the center of the chart.

7. The image evaluation chart as set forth in claim 6, wherein the image evaluation chart has the same horizontal and vertical ratios as those of a pixel of an image sensor of video equipment.

8. The image evaluation chart as set forth in claim 1, further comprising:
   a plurality of balance measurement lines symmetrically displayed at individual positions corresponding to individual resolution measurement lines at the outside of the resolution inspection area, while being spaced apart from the outer line by a predetermined distance,
   wherein each of the balance measurement lines is classified into a plurality of black-colored lines and a plurality of white-colored lines, and the black-colored lines and the white-colored lines indicated by straight lines each having a predetermined length are alternately arranged while being spaced apart from each other at regular intervals.

9. The image evaluation chart as set forth in claim 8, wherein the balance measurement lines each have the same width as the largest line width of the resolution measurement line.

10. The image evaluation chart as set forth in claim 8, further comprising:
    a plurality of position check points symmetrically arranged among the balance measurement lines in a diagonal direction to the center point.

11. An image evaluation chart, comprising:
    a resolution inspection area including:
    a center point located at a center part of the chart;
    a regular-squared outer line for allowing the center point to be located at the center of the chart; and
    a plurality of resolution measurement lines symmetrically arranged at right and left sections and upper and lower sections on the basis of the center point,
    wherein each of the plurality of resolution measurement lines is classified into a plurality of black-colored lines and a plurality of white-colored lines, the black-colored lines and the white-colored lines are alternately arranged while being spaced apart from each other at regular intervals, the longer a distance from the center point to the regular-squared outer line, the larger a width of the resolution measurement line, and the number of the resolution inspection areas is set to 9, that is, one resolution inspection area is positioned at the center of the chart, the right and left sections each contain one resolution inspection area, the upper and lower sections each contain one resolution inspection area, and four diagonal sections each contain one resolution inspection area;
    a plurality of balance measurement lines displayed at individual positions corresponding to individual resolution measurement lines at the outside of the resolution inspection area located at the center of the chart, wherein a plurality of black-colored lines and a plurality of white-colored lines are alternately arranged while being spaced apart from each other by a predetermined distance; and
    a plurality of position check points arranged among the balance measurement lines in a diagonal direction to the center point.

12. The image evaluation chart as set forth in claim 11, wherein:
    although the resolution measurement line is vertically or horizontally cut on the basis of any one of its own points, a width ratio of the black-colored line is the same as that of the white-colored line.

13. The image evaluation chart as set forth in claim 11, wherein:
    one end of the resolution measurement line is close to the center point, the other end reaches the outer line to create the largest line width, and the largest line width is more than two times larger than the nearest line width close to the center point.

14. The image evaluation chart as set forth in claim 11, wherein:

five black-colored lines are contained in the right and left sections and the upper and lower sections such that 20 black-colored lines are contained in the resolution inspection area, and four white-colored lines are contained in the right and left sections and the upper and lower sections such that 16 white-colored lines are contained in the resolution inspection area.

15. A method for testing performance of video equipment, comprising the steps of:
  a) preparing a chart including a plurality of balance measurement lines and a resolution inspection area which is composed of a center point located at a center part of the chart, a regular-squared outer line located at outside of the center point, and a plurality of resolution measurement lines symmetrically arranged at right and left sections and upper and lower sections on the basis of the center point,
  wherein each of the resolution measurement lines is classified into a plurality of black-colored lines and a plurality of white-colored lines, the black-colored lines and the white-colored lines are alternately arranged while being spaced apart from each other at regular intervals, the longer a distance from the center point to the regular-squared outer line, the larger a width of the resolution measurement line, a first resolution inspection area is positioned at the center of the chart and more than one resolution inspection area is located in the vicinity of the first resolution inspection area,
  wherein the balance measurement lines are displayed at individual positions corresponding to individual resolution measurement lines at the outside of the resolution inspection area located at the center of the chart, and are classified into a plurality of black-colored lines and a plurality of white-colored lines that are alternately arranged while being 20 spaced apart from each other by a predetermined distance;
  b) properly installing a lighting device to provide the chart with uniform illuminance;
  c) properly installing video equipment to allow the center of the chart to be aligned with the center of an image sensor of the video equipment;
  d) capturing an image of the chart; and
  e) comparing a reference value for the chart with a real value created by capturing the chart image, and testing a variety of performances such as resolution, balance, view angle, distortion, and focus.

16. The method as set forth in claim 15, wherein a prescribed equation for calculating a resolving power to determine the resolution and the balance is represented by the following Equation 1:

$$Ref = Wa - Ba \quad \text{[Equation 1]}$$

$$Wa = \sum_{i=1}^{16} Wi/16, \ Ba = \sum_{i=1}^{20} Bi/20$$

where "Ref" is a resolving power, "Wa" is an overall mean value of the white-colored lines contained in the resolution measurement lines, and "Ba" is an overall mean value of the black-colored lines.

17. The method as set forth in claim 16, further comprising the steps of:

selecting a clear portion from among the resolution measurement lines of the captured chart;
calculating a resolving power of the clear portion using the equation; and
setting the calculated resolving power to a resolution value.

18. The method as set forth in claim 16, wherein the step for determining the balance includes the steps of:
  analyzing the balance measurement lines to acquire individual values of the white-colored lines and the black-colored lines, and applying the acquired values to the Equation 1 to acquire a reference resolving power;
  selecting portions overlapped with the outer line from among the resolution measurement lines arranged at the center of the chart and its nearby areas, analyzing the selected portions to acquire individual values of the white-colored lines and the black-colored lines, and applying the acquired values to the Equation 1 to acquire a resolving power of individual positions; and
  comparing the reference resolving power with a resolving power of individual positions, and determining performance of balance on the basis of the result of the comparison.

19. The method as set forth in claim 15, wherein the view angle is determined using the following Equation 2:

$$\text{view angle } \tan^{-1}\{(dis\_d/2)/D\} \times 2$$

$$dis\_d = \text{sqrt}(dis\_x^2 + dis\_y^2) \quad \text{[Equation 2]}$$

where "dis_d" is a distance of a diagonal line actually captured, "D" is a distance between the chart and the video equipment "dis_x" is a distance of a really-captured "X", "dis_y" is a distance of really-captured "Y", and "sqrt" means a square root.

20. The method as set forth in claim 15, wherein the distortion is determined using the following Equation 3:

$$\text{Total distortion} = \{X\text{-axis distortion} + Y\text{-axis distortion}\}/2$$

$$X\text{-axis distortion} = \{(Xc-Xa)+(Xi-Xg)\}/\{Xf-Xd\} \times 2\}$$

$$Y\text{-axis distortion} = \{(Yg-Ya)+(Yi-Yc)\}/\{Yh-Yb\} \times 2\} \quad \text{[Equation 3]}$$

where "Xc–Xa" indicates a difference between X coordinates of center points of both upper ends of the chart, "Xi–Xg" indicates a difference between X coordinates of center points of both lower ends of the chart, "Xf–Xd" indicates a difference between X coordinates of center points of both center ends of the chart, "Yg–Ya" indicates a difference between Y coordinates of center points of upper and lower left-sided ends of the chart, "Yi–Yc" indicates a difference between Y coordinates of center points of upper and lower right-sided ends of the chart, and "Yh–Yb" indicates a difference between Y coordinates of center points of upper and lower center ends of the chart.

21. The method as set forth in claim 15, wherein the step for determining the focus includes the steps of:
  calculating a maximum average value of sharpness created by a correct focus using to the chart; and
  setting the focus to the calculated maximum average value to provide the best focus.

* * * * *

UNITED STATES PATENT AND TRADEMARK OFFICE
CERTIFICATE OF CORRECTION

| | |
|---|---|
| PATENT NO. | : 7,292,266 B2 |
| APPLICATION NO. | : 10/735425 |
| DATED | : November 6, 2007 |
| INVENTOR(S) | : K.-T. Lee et al. |

It is certified that error appears in the above-identified patent and that said Letters Patent is hereby corrected as shown below:

| COLUMN | LINE | ERROR |
|---|---|---|
| (57) Pg. 1, col. 2 | Abstract 5-6 of text | "located at outside of" should read --located outside of-- |
| 13 (Claim 15, | 13-14 line 6-7) | "located at outside of" should read --located outside of-- |
| 13 (Claim 15, | 35 line 28) | after "while being" delete "20" |
| 14 (Claim 19, | 27 line 3) | "{(dis_d/2)/D)×2" should read --{(dis_d/2)/D}×2-- |
| 14 (Claim 19, | 32 line 7) | after "video equipment" insert --,-- |
| 14 (Claim 20, | 40 line 5) | after "×2" delete "}" |
| 14 (Claim 21, | 60 line 4) | "using to the chart;" should read --using the chart;-- |

Signed and Sealed this
Fifteenth Day of November, 2011

David J. Kappos
*Director of the United States Patent and Trademark Office*